United States Patent

[11] 3,612,688

[72] Inventor John W. Liskowitz
 Belle Meade, N.J.
[21] Appl. No. 775,449
[22] Filed Nov. 13, 1968
[45] Patented Oct. 12, 1971
[73] Assignee American Standard Inc.
 New York, N.Y.

[54] SUSPENDED ORGANIC PARTICLES MONITOR USING CIRCULARLY POLARIZED LIGHT
 13 Claims, 4 Drawing Figs.
[52] U.S. Cl. .................................................. 356/102,
 250/218, 250/225, 356/114, 356/208, 356/210
[51] Int. Cl. ................................................. G01n 15/02,
 G01n 21/00, G01n 21/40
[50] Field of Search ........................................356/102–104,
 114–116, 207–210; 250/218, 227

[56] References Cited
 UNITED STATES PATENTS
 2,858,727 11/1958 Stamm et al. ................. 356/104
 2,877,683 3/1959 Fischer ......................... 250/218 X
 3,283,644 11/1966 Saltzman ....................... 356/114
 3,373,652 3/1968 Flador .......................... 356/115 X
 3,420,609 1/1969 Kozawa ........................ 356/104
 3,450,477 6/1969 Meltzer ........................ 356/114

OTHER REFERENCES
Vogel et al., Rgu. Sci. Sci. Inst., V. 38, N.Y. pp. 499–501, 356/104.
Weissberger, Phys. Meth. Org. Chem., Interscience Pub., N.Y. 1960, pp. 2125–2128.
Zimm, J. Chem. Phys., V. 16, N.12, 12/48, pp. 1099–1116, 356/104.
Wright, Rev. Sci. Inst., V. 28, N. 2, 2/57, pp. 129–134, 356/104

Primary Examiner—Ronald L. Wibert
Assistant Examiner—Warren A. Sklar
Attorneys—Sheldon H. Parker, Tennes I. Erstad and Robert G. Crooks ABSTRACT: Method for detecting optically active organic particles suspended in a fluid, including water, air or a vacuum, by measuring circular dichroic absorption. The method comprising the steps of alternately transmitting right circularly polarized light and left circularly polarized light through the fluid being analyzed whereby the circularly polarized light is scattered by the particulate matter in the sample. The scattered radiation is analyzed by separating the circularly polarized components in the resulting scattered light and measuring the intensity of the resulting scattered light components. The circular dichroic absorption in the scattered lights is represented by the ratio of the component intensity of when starting with right circularly polarized light to that of the intensity when starting with left circularly polarized light.

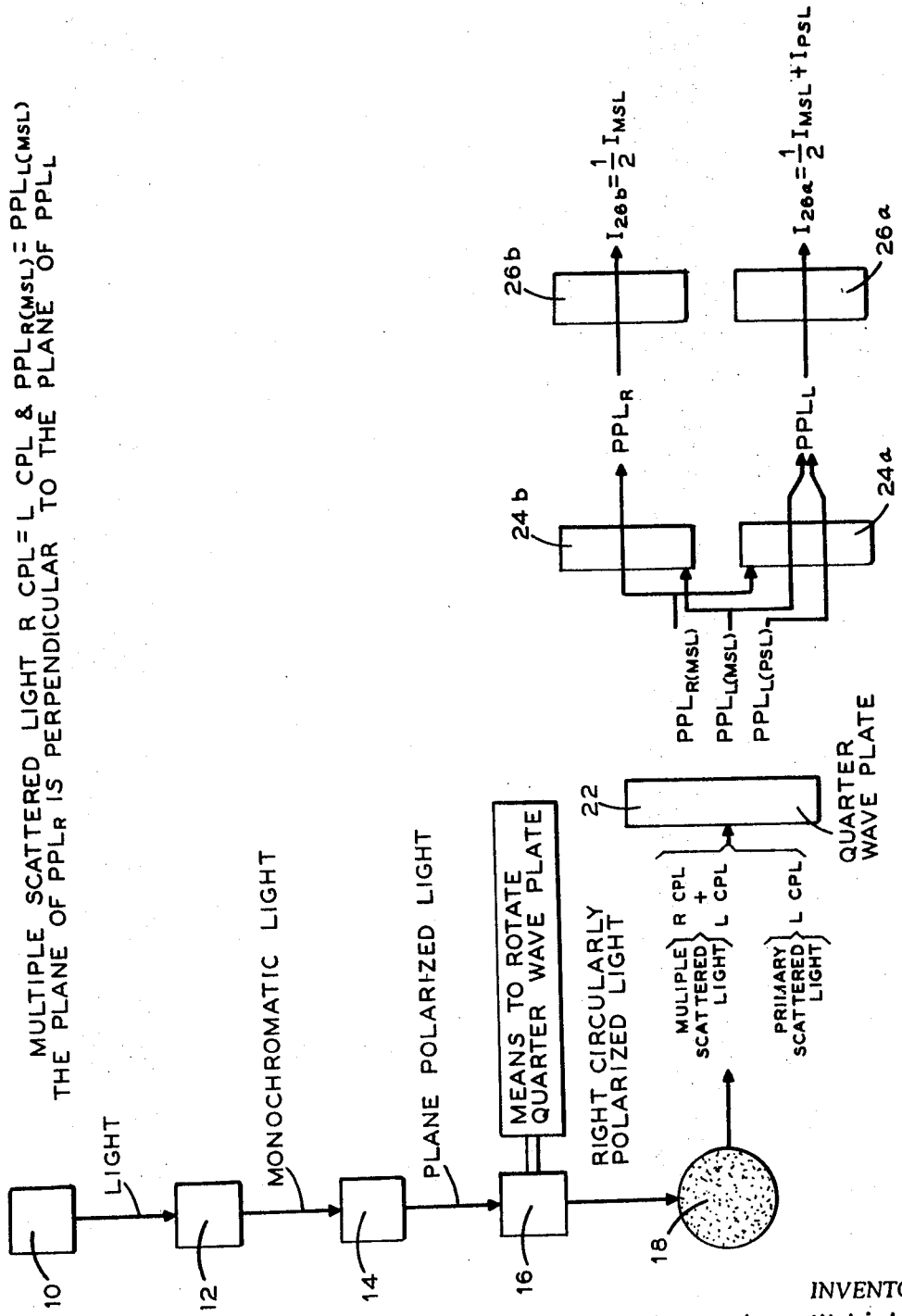

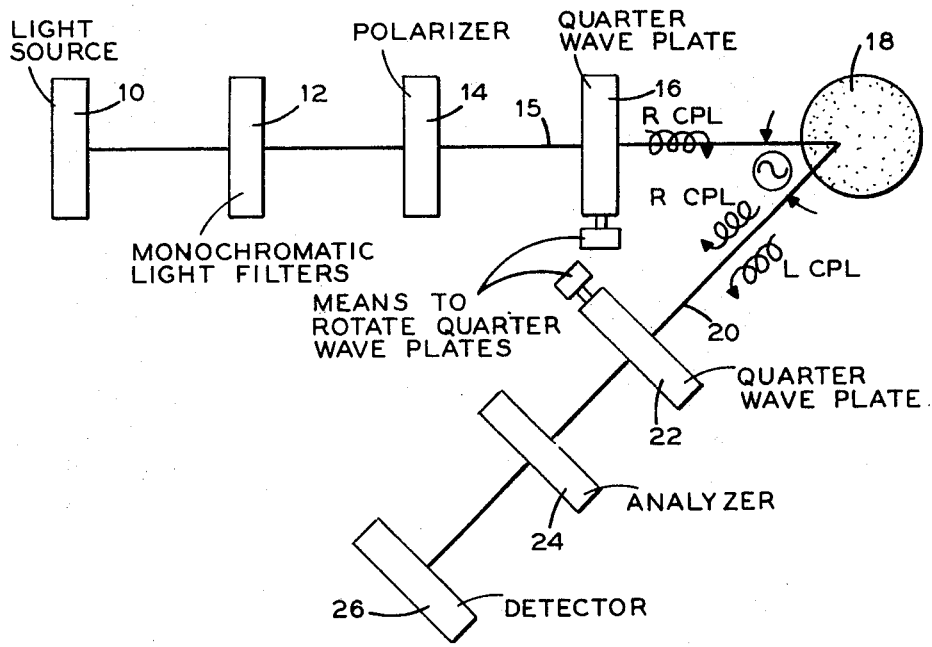
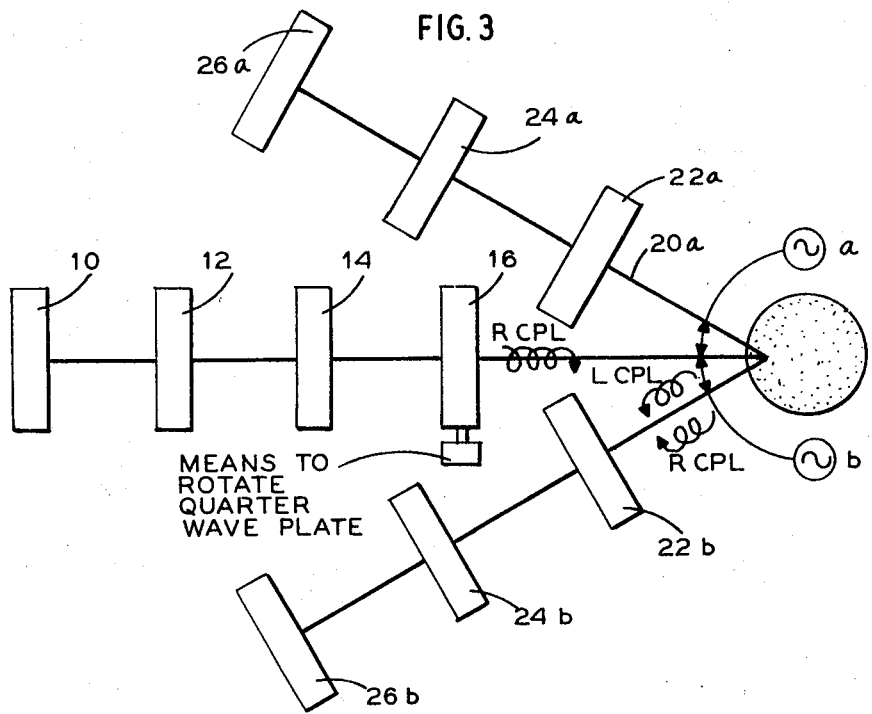

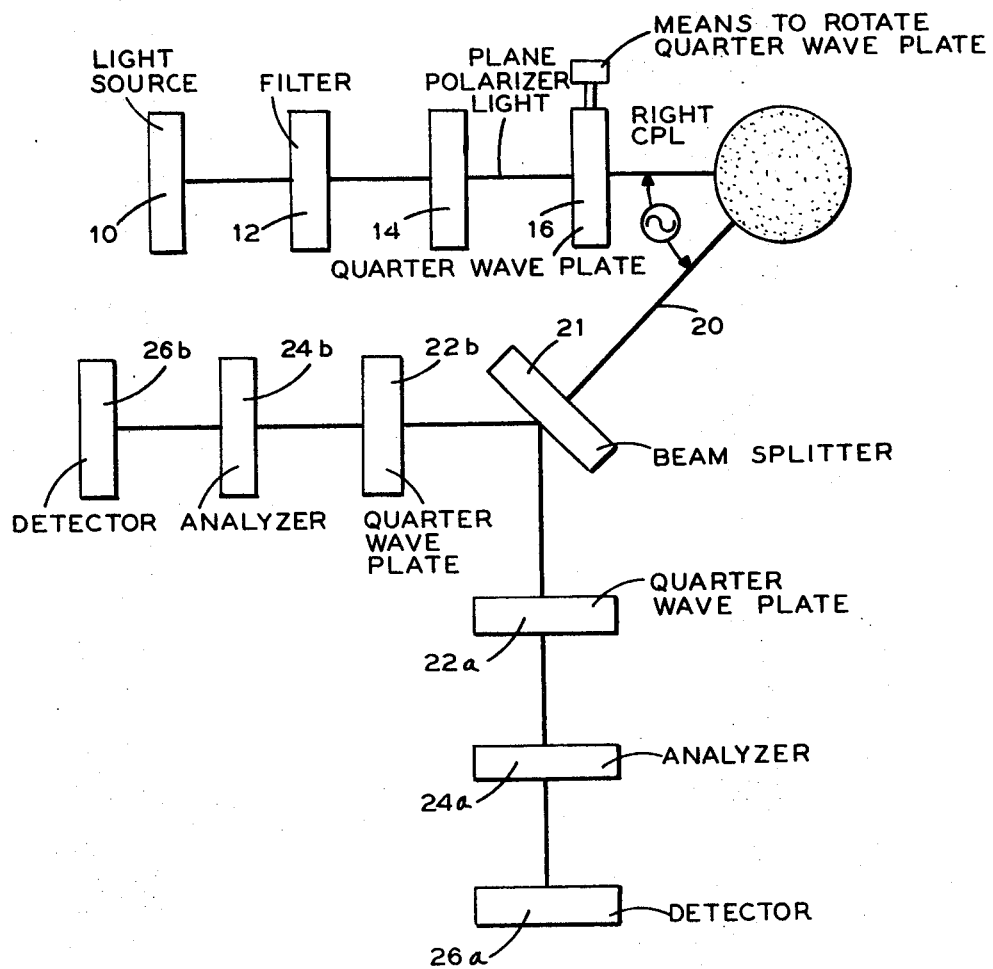

SUSPENDED ORGANIC PARTICLES MONITOR USING CIRCULARLY POLARIZED LIGHT

BACKGROUND OF THE INVENTION

1. Field of the Invention

This invention relates to the detection of optically active organic particles, and more particularly to a method for measuring the circular dichroism exhibited by optically active compounds in a scattering medium.

2. Description of the Prior Art

The detecting and analyzing of particles of organic matter has been investigated for many years, and many techniques have been developed.

It is known, for example that suspended matter in water can be determined by its optical techniques such as light absorption and light-scattering techniques.

Typically, the techniques may require the material under analysis to be available for physical handling or may require the positioning of an analyzer immediately adjacent the sample under analysis.

U.S. Pat. applications, Ser. Nos. 629,569 and 629,528, filed Apr. 10, 1967, commonly assigned and copending herewith, disclose systems for the determination of concentrations of particles suspended in a fluid, and the circular dichroic absorption of particles suspended in a fluid.

SUMMARY OF THE INVENTION

It has now been found that organic particles suspended in a fluid can be studied by the analysis of scattered circularly polarized light.

In accordance with the present invention there is provided a method for detecting optically active organic particles comprising the steps of alternately transmitting right-circularly polarized light and left-circularly polarized light through the fluid being analyzed whereby the circularly polarized light is scattered by the particulate matter in the sample. An analyzer positioned at an angle, preferably at least about 170**, with respect to the direction of the incident beam, receives resulting scattered light which then goes to a detector. The intensity of the scattered light components is measured and the circular dichroic absorption is represented by the ratio of the component intensity when the incident light is right circularly polarized light to that the component intensity when the incident light is left circularly polarized light.

BRIEF DESCRIPTION OF THE DRAWINGS

The objects and advantages of the invention will become evident and will be fully understood, from the following description when read in conjunction with the drawings wherein:

FIG. 1 is a schematic representation of a system in accordance with the present invention;

FIG. 2 is a modification of an apparatus for carrying out the invention;

FIG. 3 is a further modification of an apparatus in accordance with the present invention; and FIG. 4 is another modification in accordance with the present invention.

DESCRIPTION OF THE PREFERRED EMBODIMENTS

Referring to the FIG. 1, light from the light source 10 is filtered by means of the light filters 12 thus producing monochromatic light which is converted to plane polarized light (PPL) by means of the polarized 14 and then alternately converted into right circularly polarized light and left circularly polarized light by means of a quarter wave plate 16 which is rotatable or a Pockel's Cell. The circularly polarized light is transmitted to a medium 18. Light which undergoes multiple scattering is converted equally into right circularly polarized light (RCPL) and left circularly polarized light (LCPL). This is true irrespective of whether the light from the quarter wave length 16 is right or left-circularly polarized. The primary scattered light is entirely converted from RCPL to LCPL, or from LCPL to RCPL. The quarter wave plate 22 converts both the right and left CPL into plane-polarized light.

The right-circularly polarized light resulting from multiple scattered and which is converted into plane-polarized light is indicated as $PPL_{R(MXL)}$ and the left-circularly polarized light which results from multiple scattering and which is converted into plane polarized light is designated $PPL_{L(MSL)}$. The left-circularly polarized light resulting from primary scattering and which is converted into plane polarized light is designated as $PPL_{L(PSL)}$. While the corresponding designation for right-circularly polarized light is $PPL_{R(PSL)}$. The plane of $PPL_R$ is perpendicular to the plane of $PPL_L$ and there fore a pair of analyzers 24a and 24b can be used to separate $PPL_R$ and $PPL_L$. The light which passes through analyzers 24a and 24b is transmitted to the corresponding detector 26a and 26b. The intensity of the light recorded by the detector 26b differs from the intensity of the light which passes through analyzer 24a and which is received by the detector 26a, by a factor which is dependent upon primary scattering of light as well as by the presence in medium 18 which selectively absorbs right or left-circularly polarized light.

Primary scattering is dependent predominantly upon the surface area of the particle whereas multiple scattering is predominantly dependent upon the volume of the particle.

Therefore, in order to eliminate the influence or effect of primary scattering detector 26b is employed when the incident light is right-circularly polarized and detector 26a is employed when the incident light is left-circularly polarized. The existence of a difference between the intensity recorded by 26a and 26b indicates the presence of particles which selectively absorb right or left circularly polarized light.

Briefly stated, the critical aspect of the invention involves comparing the affect of a particle upon right-circularly polarized light with its affects upon left-circularly polarized light.

The observation of nonequal affects upon left and right-circularly polarized light indicates the presence of particles which selectively absorb left or right-circularly polarized light, when the system of the present invention is employed.

The arrangement of the apparatus as shown in FIG. 1 is intended as a simple illustration of the instant invention. It should be understood, however, that the present invention can be carried out with a variety of structural arrangements.

For example, if the quarter wave plate 16 is mounted for rapid rotation, a pulsating change from right-circularly polarized light to left-circularly polarized light can be achieved. The scattered light can be analyzed by a single quarter wave plate - analyzer - detector system as shown in FIG. 2 if means are provided which is capable of storing and comparing the signals generated by the pulsating incident light and for rotating either the quarter wave plate 22 or the analyzer 24 so that it passes radiation of the same handedness as the incident light.

The quarter wave plate 22 would be mounted for rotation at a rate equal to that of the rate of the pulsation of the circularly polarized incident light.

As shown in FIG. 3, a pair of quarter wave plate - analyzer - detector units can be employed. Functionally, the unit of FIG. 3 which includes the quarter wave plate 22b, analyzer 24b and detector 26b corresponds to the unit of FIG. 1, which includes the quarter wave plate 22, the analyzer 24b and detector 26b while the unit of FIG. 3 which includes the quarter wave plate 22a, the analyzer 24a and the detector 26a corresponds to the unit of FIG. 1, which includes the quarter wave plate 22, the analyzer 24a and the detector 26a. The detectors 26a and 26b would be used alternately corresponding to the rate of pulsation of the incident light from right-circularly polarized light to left-circularly polarized light.

As shown in FIG. 4, a beam splitter 21 can be employed in order to eliminate the errors which can result from difference between the angle $\theta_a$ and $\theta_b$.

While for convenience, reference has been made to the physical rotation of various elements such as the quarter wave plate 16, 22a and 22b, it should be noted that it is preferable to use the electronic equivalent to physical rotation, which can be achieved by using a pocket's which employs an electrical field to introduce birefringence into a solid material.

While the invention is described herein, primarily in connection with its use in qualitative analysis, it can produce quantitative reading when the results are compared with known, that is, predetermined calibrations.

The system can be used to detect the presence of biological matter in the atmosphere, since only biologically derive matter in naturally occurring material preferentially absorbs the circularly polarized radiation. In one aspect of this application, and instrument in accordance with the present invention could be incorporated in a missile which is to be landed on, or fly-by a distant planet or the like. The instrument would at some predetermined time or continuously indicate the presence of biological matter in the region upon which the system is focused.

An auxiliary system could be employed to cause particles on the surface of the planet to be spread in the atmosphere, as for example, through the use of a small explosive.

Particularly in the case of the application wherein the system is landed on a planet, a variable focus system can be employed in order to permit the analyzing of particles at various distances from the analytical instrument.

The system of the present invention can also be used to indicate with varying specificity, the type or class of optically active material being analyzed. Different materials responded differently to light of different wavelengths.

For example, the nucleic acids exhibit circular dichroic absorption when using radiation at a wavelength of about 260 millimicrons.

Therefore, through the use of light filters or by varying the light source or use a light source capable of varying the wavelength of the light which it is emitting, the material being observed can be determined with various degrees of specificity.

The system of the instant invention can also be used as a warning device for military purposes, to warn of the presence of biological matter, of the type used in biological warfare. The region under analysis can be the region just behind a distant aircraft, thus permitting the instantaneous and safe analyzing of the atmosphere without the necessity of actually entering into, or even approaching the region under observation. The system can be set to trigger a warning light or other signal, as soon as a ratio other than "one" is observed.

In another application, the instrument of the present invention can be used in conjunction with a microscope. It is noted that the system is actually enhanced as the observation angle approaches 180° and therefore in the microscope application, it is desirable to locate the light source in or parallel to the microscope lens system. Typically, angles of at least 170° are employed in order to approach optimum conditions.

A living cell or organism can thus be continuously monitored and by using particular light wavelengths, the creation or destruction of particular biological molecules can be continuously monitored without subjecting the organism to any outside influence other than the incident light.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

GLOSSARY OF TERMS

Back Scattering—Scattering The phenomena of the light having its direction of travel changed by more than 90° from the direction of travel of the incident light.

Multiple Scattering—The scattering of light by a plurality of particles so that the light changes its direction of travel more than once.

Primary Scattering—The scattering of light off a single particle so that the direction of travel is changed only once.

Analyzer—A device, such as a polarizer prism or a polarizing filter which can isolate the component in scattered light vibrating either parallel or perpendicular to the axis of the polarized light. A polarizer prism functions by absorbing the undesired light.

Detector—A device which is used in measuring the intensity of light transmitted from the analyzer. A photocel or photomultiplier can be used.

Quarter Wave Plate—A device which can convert plane polarized light into either right or left polarized light or right- or left-circularly polarized light into plane polarized light.

Light—A form of radiant energy, which include ultraviolet, visible and infrared radiation.

$E_{\parallel}$—The intensity of the component of light having its optical axis parallel to the axis of the incident polarized light.

$E_{\perp}$—The intensity of the component of light having its optical axis perpendicular to the axis of the incident polarized light.

$E_T$—Intensity of the total scattered light $(E_{\parallel}+E_{\perp})$.

Degree of Depolarization—Typically refers to the ratio of E $\frac{E_{\perp}}{E_{\parallel}}$, although other ratios can be used.

$E_{Polarized}$—Intensity of plane polarized light. $(E_{\parallel}-E_{\perp})$ $E_{Depolarized}$"B"Intensity of depolarized light $(2\times E_{\perp})$ $E_{Multiple}$ — —of circularly polarized light which has undergone primary scattering.

$E_{Primary}$—Intensity of circularly polarized light which has undergone primary scattering.

Observation Angle—The angle formed by the path of the incident polarized light and the scattered light which is being observed: Light which is transmitted directly through a medium would be observed at an angle 0°, while the angle for light which is back scattered to the maximum extent is 180°.

Suspended Solids—Any coherent particles, liquid, solid or gaseous bubbles, which are suspended in a fluid or vacuum, provided there is a difference between the refractive index of the particles and the fluid.

The phraseology, and definitions employed herein, are for the purposes of description and enhancing the understanding of the invention rather than for the purpose of establishing limitations of the invention.

I claim:

1. Method for detecting optically active organic particles suspended in a fluid comprising:
   alternately transmitting incident light which is right-circularly polarized and left-circularly polarized to a fluid to be analyzed;
   alternately measuring the intensity of the backscattered right-handed and left-handed circularly polarized light which is backscattered at a predetermined angle with respect to said incident light; and
   comparing the respective intensities of said backscattered right-handed and left-handed circularly polarized light when said incident light is right circularly polarized, to the respective intensities of said backscattered right-handed and left-handed circularly polarized light when said incident light is left circularly polarized, whereby the concentration of optically active organic particles suspended in a fluid is determined as a function of the compression of the respective intensities.

2. The method of claim 1, wherein said step of alternately measuring comprises alternately measuring the backscattered left-handed and right-handed circularly polarized light at an angle which is at least about 170°.

3. Method for use in detecting the presence in a fluid sample of biological matter which preferentially absorbs right- or left-circularly polarized light, comprising:
   left-circularly polarizing a first incident beam of light;
   right-circularly polarizing a second incident beam of light;
   projecting said left-circularly polarized first incident beam of light into a fluid sample to be analyzed;

projecting said right-circularly polarized second incident beam of light into said fluid sample to be analyzed;

measuring the intensity of at least one of the backscattered right-handed circularly polarized light and the backscattered left-handed circularly polarized light which is backscattered at a predetermined angle with respect to said incident light which is left circularly polarized; when said incident beam is left circularly polarized.

measuring the intensity of at least one of said backscattered right-handed circularly polarized light and left-handed circularly polarized light which is backscattered at said predetermined angle when said incident beam is right circularly polarized; and comparing the respective measured intensities of the backscattered right- and left-handed circularly polarized light when said incident light is right-circularly polarized to the respective measured intensities of said backscattered right- and left-handed circularly polarized light when said incident light is left-circularly polarized whereby the presence in said fluid, of biological matter which preferentially absorbs right- and left-circularly polarized light, is determined as a function of the comparison of the respective intensities.

4. Method of claim 3 wherein the steps of measuring the intensities of backscattered light comprises measuring the intensities of light which is backscattered at an angle of at least about 170°.

5. Method of claim 3 wherein the intensities of the circularly polarized light are measured by converting the circularly polarized light to plane polarized light having a particular plane of polarization and measuring the intensity of the plane polarized light in said particular plane of polarization.

6. Method of claim 3, wherein the steps of measuring the intensities of backscattered right- and left-handed circularly polarized light comprise the conversion of the right-circularly polarized light to plane polarized light having a first plane of polarization and the conversion of left-circularly polarized light to plane polarized light having a second plane polarization, and measuring the intensities of the plane polarized light in each of said first and second planes of polarization.

7. Apparatus for use in detecting optically active organic particles suspended in a fluid sample, comprising:

light source means for producing an incident beam of circularly polarized light;

alternator means, associated with said light source means for alternately converting said circularly polarized light from left- to right-circularly polarized light;

analyzer means positioned on the light source side of the fluid sample for isolating left-handed and right-handed circularly polarized light isolated by said analyzer means and detector means responsive to the light from the analyzer means to produce respective first and second measuring signals;

means for utilizing said first and second measuring signals as an indication of optically active organic particles in a fluid sample.

8. The apparatus of claim 7, wherein said light source means comprises first means for plane polarizing an incident beam of light, and second means for circularly polarizing said plane polarized incident beam of light.

9. Apparatus for use in detecting the presence in a fluid sample, of biological matter which preferentially absorbs right- or left-circularly polarized light, comprising:

first light source means for producing a first incident beam of right-circularly polarized light;

second light source means for producing a second incident beam of left-circularly polarized light;

analyzer means positioned on the light source side of a fluid sample for isolating left-handed and right-handed circularly polarized light components backscattered by particles in said fluid sample;

first means for detecting one of said components of circularly polarized light backscattered by particles of said fluid sample, said component being of the same handedness as the circularly polarized light produced by said first light source means to produce a first measuring signal;

second means for detecting one of said components of circularly polarized light backscattered by particles in said fluid sample, said component being of the same handedness as the circularly polarized light produced by said second light source means to produce a second measuring signal;

means for utilizing said first and second measuring signals for detecting the presence in a fluid sample of biological matter which preferentially absorbs right- or left-circularly polarized light.

10. The apparatus of claim 9, wherein said first source means comprises first means to plane polarize light and means to circularly polarize said plane polarized light and said second source means comprises second means to plane polarize light, said second means to plane polarize light being oriented to produce polarized light which has its optical axis in a plane which is perpendicular to the plane of the polarized light produced by said first means to plane polarize light, and means to circularly polarize said plane polarized light.

11. The apparatus of claim 1, wherein said analyzer means is positioned to receive light backscattered, in a backward direction more than 90° from the direction of travel of said incident beam of circularly polarized light.

12. The apparatus of claim 7, wherein said analyzer means is positioned to receive light backscattered, in a backward direction more than 90° from the direction of travel of the incident beam of circularly polarized light.

13. The apparatus of claim 7, wherein said analyzer means is positioned to receive light backscattered in a backward direction more than 170° from the direction of travel of said incident beam of circularly polarized light.